(12) United States Patent
Devys et al.

(10) Patent No.: US 11,136,263 B2
(45) Date of Patent: Oct. 5, 2021

(54) FUNCTIONAL GLAZING PROVIDED WITH A PERMANENT PROTECTIVE FILM

(71) Applicant: SAINT-GOBAIN GLASS FRANCE, Courbevoie (FR)

(72) Inventors: Lucie Devys, Paris (FR); Nisita Wanakule, Paris (FR); Michele Schiavoni, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 33 days.

(21) Appl. No.: 16/765,724

(22) PCT Filed: Nov. 28, 2018

(86) PCT No.: PCT/FR2018/053031
§ 371 (c)(1),
(2) Date: May 20, 2020

(87) PCT Pub. No.: WO2019/106295
PCT Pub. Date: Jun. 6, 2019

(65) Prior Publication Data
US 2020/0290922 A1 Sep. 17, 2020

(30) Foreign Application Priority Data
Nov. 30, 2017 (FR) ...................................... 1761458

(51) Int. Cl.
*C03C 17/36* (2006.01)
*C08J 7/04* (2020.01)
(Continued)

(52) U.S. Cl.
CPC ............ *C03C 17/366* (2013.01); *C03C 15/00* (2013.01); *C03C 17/3618* (2013.01);
(Continued)

(58) Field of Classification Search
CPC ... C03C 17/366; C03C 15/00; C03C 17/3618; C03C 17/3626; C03C 17/3644;
(Continued)

(56) References Cited

U.S. PATENT DOCUMENTS 7,541,087 B2 6/2009 Kobayashi et al.
2002/0163681 A1 11/2002 Taggi et al.
(Continued)

FOREIGN PATENT DOCUMENTS

EP 0 718 250 A2 6/1996
EP 2 685 294 A1 1/2014
(Continued)

OTHER PUBLICATIONS

International Search Report as issued in International Patent Application No. PCT/FR2018/053031, dated Mar. 1, 2019.

*Primary Examiner* — Humera N. Sheikh
*Assistant Examiner* — John D Schneible
(74) *Attorney, Agent, or Firm* — Pillsbury Winthrop Shaw Pittman LLP

(57) ABSTRACT

A glazing article, includes a substrate made of glass or made of organic substance, on the surface of which are deposited a layer or a stack of layers conferring, on the article, a functionality, in particular solar protection, thermal insulation or anticondensation properties, with a total thickness of between 5 nanometers and 400 nanometers, an organic film covering the layer or the stack of layers, the thickness of the polymer film being between 300 nanometers and 10 micrometers, wherein a texturing element is present under the layer or the stack of layers, the roughness of the surface of the texturing element being such that: the arithmetic mean deviation $R_a$ is between 50 nm and 2 micrometers, limits included, the base length $R_{Sm}$ is between 5 micrometers and 300 micrometers, limits included.

26 Claims, 1 Drawing Sheet

1b

1a

(51) Int. Cl.
*C03C 15/00* (2006.01)
*C03C 17/38* (2006.01)
*G02B 5/02* (2006.01)

(52) U.S. Cl.
CPC ...... *C03C 17/3626* (2013.01); *C03C 17/3644* (2013.01); *C03C 17/3652* (2013.01); *C03C 17/38* (2013.01); *C08J 7/0423* (2020.01); *G02B 5/0221* (2013.01); *C08J 2333/12* (2013.01); *C08J 2367/02* (2013.01); *C08J 2369/00* (2013.01)

(58) Field of Classification Search
CPC .... C03C 17/3652; C03C 17/38; C08J 7/0423; C08J 2333/12; C08J 2367/02; C08J 2369/00; G02B 5/0221
USPC .......................................................... 428/432
See application file for complete search history.

(56) References Cited

U.S. PATENT DOCUMENTS

| | | | |
|---|---|---|---|
| 2007/0178316 A1* | 8/2007 | Mellott | B05D 5/06 428/426 |
| 2010/0124642 A1* | 5/2010 | Lu | C23C 14/083 428/215 |
| 2010/0285290 A1* | 11/2010 | Lu | C03C 17/3417 428/213 |
| 2011/0261443 A1* | 10/2011 | Isojima | C09D 5/004 359/360 |

FOREIGN PATENT DOCUMENTS

| | | | | |
|---|---|---|---|---|
| FR | 2 414 114 A1 | | 8/1979 | |
| JP | 2013/256104 | * | 12/2013 | ....... B32B 17/10036 |
| WO | WO 2007/101964 A1 | | 9/2007 | |
| WO | WO 2013/089185 A1 | | 6/2013 | |
| WO | WO 2014/009667 A1 | | 1/2014 | |
| WO | WO-2014061613 A1 | * | 4/2014 | ......... C03C 17/3639 |
| WO | WO 2016/097599 A1 | | 6/2016 | |
| WO | WO 2017/103465 A1 | | 6/2017 | |

* cited by examiner

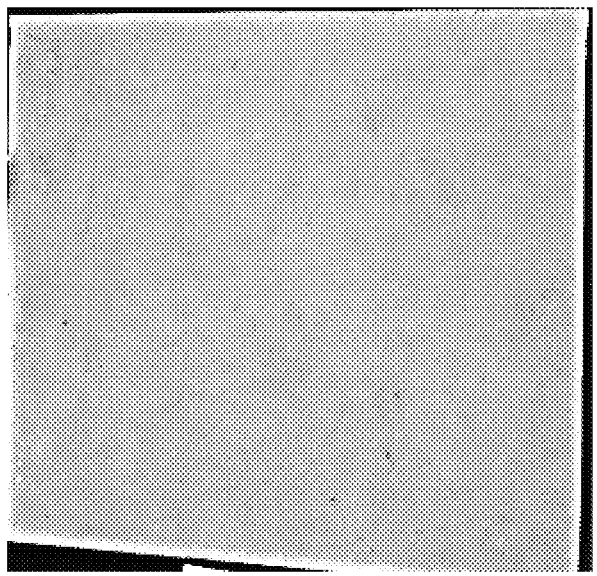
1b
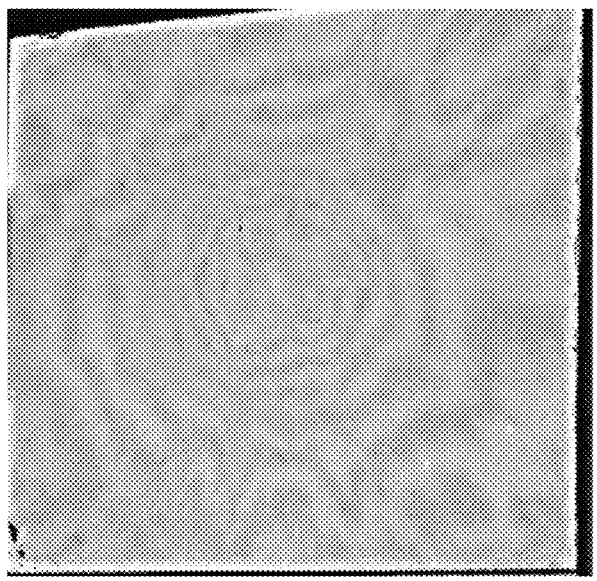
1a

FUNCTIONAL GLAZING PROVIDED WITH A PERMANENT PROTECTIVE FILM

CROSS-REFERENCE TO RELATED APPLICATIONS

This application is the U.S. National Stage of PCT/FR2018/053031, filed Nov. 28, 2018, which in turn claims priority to French patent application number 1761458 filed Nov. 30, 2017. The content of these applications are incorporated herein by reference in their entireties.

The invention relates to an article comprising a substrate, for example a glass substrate, in particular a glazing, comprising a stack of thin layers conferring, on said article, a functionality, in particular of the type reflecting infrared IR radiation, of the solar (near IR) or thermal (far IR) type. Other functionalities can also be envisaged according to the present invention, in particular for conferring, on the article according to the invention, certain colorations or more generally for conferring certain optical properties desired for the glazing.

An article according to the invention, such as a glazing, is more particularly suitable for equipping buildings, even if it is not limited thereto and that in particular it can also be used in the motor vehicle field, in particular as side window, sunroof or else rear window. It is also capable of being used as refrigerator door or showcase having an antimisting (anticondensation) function, in particular for equipping displays of frozen products in supermarkets.

In a known way, in the case of a glass article having infrared-reflecting properties, it is possible, by selecting the chemical natures, the thicknesses and the sequence of the thin layers constituting the stack, to significantly influence the amount of energy from solar radiation entering or exiting premises or a passenger compartment. In particular, such a glazing makes it possible to prevent excessive heating inside said premises or passenger compartment in summer and thus contributes to limiting the consumption of energy required for the air-conditioning thereof. According to another possible aspect of the invention, the latter also relates to thermal insulation glazings, often known as low-e or low emissivity glazings in the field, more particularly intended for the thermal insulation of buildings or vehicles. Low-e stacks can also advantageously be used in the glazed parts of refrigerated appliances of the refrigerator door or showcase type for their thermal insulation functionality.

These layered glazings are subject to a certain number of constraints: as concerns the glazings, the layers employed must first be sufficiently screening with regard to solar radiation, that is to say that they must make possible thermal insulation while allowing, however, at least a part of the light to pass through, as measured by the light transmission $T_L$. In addition, these thermal performance qualities must preserve the optical aspect and the esthetics of the glazing: it is thus desirable to be able to modulate the level of light transmission of the substrate, while retaining a color judged to be attractive and preferably substantially neutral and uniform, in particular in transmission but preferably also or in exterior and/or interior reflection. In particular, the appearance of zones of iridescence at the surface of the glass surface is not acceptable from a commercial viewpoint.

According to another essential aspect, these layers must also be sufficiently durable, all the more so if, in the glazing once installed, they are positioned on one of the external (interior or exterior) faces of the glazing (as opposed to the internal faces, turned toward the inserted gas-filled cavity of a double glazing, for example, or also toward the thermoplastic sheet of a laminated glazing).

A great many "thermal control" stacks, that is to say stacks which make it possible to regulate the heat flow entering or exiting glass surfaces equipping the building or passenger compartment, are known today.

They are grouped together under the designation of thermal insulation glazing. They are sold and used essentially according to two categories:

either to provide essentially protection of the dwelling from solar radiation and to prevent overheating thereof, such glazings being described in the industry as solar protection glazings, or to provide essentially thermal insulation of the dwelling and to prevent losses of heat, these glazings then being described as insulating glazings.

Solar protection is thus understood to mean, within the meaning of the present invention, the property of the glazing of limiting the energy flow, in particular the infrared solar (IRS) radiation, passing through it from the exterior toward the interior of the dwelling or of the passenger compartment.

Thermal insulation is thus understood to mean a glazing provided with at least one functional layer conferring on it a reduced energy loss, said layer exhibiting properties of reflecting thermal IR (also known as middle infrared) radiation of between 3 at 50 micrometers. In some countries, the standards imply that the glazings exhibit both solar protection and thermal insulation properties.

In a well-known way, for example described in the reference publication "Les techniques de l'ingénieur, *Vitrage à isolation thermique renforcée* [Techniques of the Engineer, *Reinforced Thermal Insulation Glazing*], C3635 (2004)", such a reflection property is directly a function of the emissivity of the face of the glazing provided with the stack comprising the functional layer or layers.

Generally, all the light and thermal characteristics presented in the present description are obtained according to the principles and methods described in the international standards ISO 9050 (2003) and ISO 10292 (1994) or also NF EN 12898: 2001, relating to the determination of the light and energy characteristics of the glazings used in glass for the construction industry.

Combined with the glass substrate, these coatings should also preferably be esthetically pleasing, that is to say that the glazing provided with its stack should exhibit a colorimetry, both in transmission and in reflection, which is sufficiently neutral not to inconvenience the users, or alternatively a slightly blue or green tint, in particular in the field of the construction industry.

The most effective stacks currently sold to solve the preceding problems incorporate a functional metal layer (that is to say a layer responsible for the properties of reflecting IR radiation) made of precious metal of the gold or silver type or also made of copper (or made of an alloy of these metals), in particular made of silver, operating essentially in the mode of the reflection of a major part of the incident IR (infrared) radiation. These stacks can advantageously be used as glazings of the low-e type for the thermal insulation of buildings but can also, in a more limited fashion, be used as solar control glazing.

The following definitions are given:

Infrared radiation is understood to mean near or solar IR radiation with a wavelength of between 0.78 and 3 micrometers and thermal (or middle) IR radiation with a wavelength of between 3 and 50 micrometers.

The role of a solar protection (or solar control) glazing is to reflect a major part of the near IR resulting from solar radiation in order to prevent the dwelling or the passenger compartment from warming up.

The role of a thermal control glazing is to reflect a major part of the thermal IR in order to prevent loss of heat from the dwelling/passenger compartment toward the outside.

However, these layers are very sensitive to external agents, such as moisture, and are thus exclusively used in double glazings, on face 2 or 3 of the latter, in order to be protected from moisture. It is accepted today that it is not possible to deposit such layers on single (also known as monolithic) glazings or also on the outermost face of a multiple glazing (conventionally called face 1) or also on the interior face of a multiple glazing (conventionally called face 4 for a double glazing) as these layers degrade very rapidly and become oxidized under the action of external moisture or even moisture present on the inside. Such layers are thus not durable on the external face and must necessarily be deposited on the internal face of a multiple glazing. Even if the invention is not limited to such layers, one of the main objects of the present invention is to provide glazings provided with stacks of layers which influence the amount of heat passing through the glazing and at least one of which is made of copper or made of precious metal (Ag or Au), more particularly made of silver.

With the aim of making possible the deposition of a stack comprising at least one silver layer on an exterior (internal or external) face, it has already been proposed, in the literature, to protect it with a protective film, in particular made of polymer plastic substance, which covers said stack after it has been deposited. Mention may be made, for example, of the following applications:

The application WO 2013089185 describes a configuration according to which use is made of a polymer of the polyacrylonitrile (PAN) or polymethacrylonitrile (PMAN) type, deposited on an IR-reflecting stack, itself being deposited on a substrate. It is indicated that the polymer makes it possible to protect the stack by increasing its resistance to abrasion and its mechanical strength, in particular when it is subjected to constraints arising from exterior thermal variations.

The patent application EP 2 685 294 alternatively describes the use of a protective plastic film made of polycycloolefin with the aim of rendering an external IR-reflecting stack mechanically strong.

The French patent application FR 2 414 114 describes the use, as protective layer, of a polyethylene (PE), polypropylene (PP) or polyacrylonitrile (PAN) polymer.

The patent applications WO2016/097599 and WO2017/103465 of the applicant company describe other possible types of coatings of the PVDC type or also of the styrene/butadiene type.

The choice of the protective polymer material, according to these documents of the art, is guided by the quality of the mechanical protection and the chemical resistance, in particular resistance toward corrosion, which it confers on the stack.

However, while the use of such polymer coatings makes it possible to effectively solve the problem of the chemical durability of the glass article, it is apparent, however, that the combination of such films, covering and protecting stacks of thin layers of the type described above, results in an overall esthetic of the glass article which does not allow it to be marketed, due to the presence of iridescent zones at the surface of the article. Such a phenomenon seems to result from optical interferences between the different thin inorganic layers and the organic film which are positioned above the glass surface.

This same phenomenon is observed if the substrate is not glass but made of hard plastic substance, for example made of PMMA or made of polycarbonate. Hard plastic is precisely understood to mean, within the meaning of the present invention, any plastic substance which is sufficiently strong mechanically to be able to be used as glass element (substrate) of a glazing, such as a window, a motor vehicle window or a showcase.

According to certain other possible configurations according to the invention, the substrate on which the layer or the stack of layers is deposited may not be rigid but flexible, for example in the form of a PET film which can itself be added onto a glass substrate or a substrate made of PMMA or made of polycarbonate.

It is thus an object of the present invention to provide an article which can be used in particular for thermal control, in particular a solar-protection glazing or a "low-e" glazing, or also a glazing for a refrigerator door or showcase, incorporating in particular a metal layer such as mentioned above in functional stack, especially in a low-e or solar-protection stack, which can be positioned on one of the external faces of said glazing while being durable over time, and which does not exhibit a phenomenon of iridescence at its surface.

The present invention relates in particular to thermal control glazings in their entirety consisting of or incorporating such an article, that is to say both to solar-protection glazings and to thermal insulation glazings.

More specifically, the present invention relates, in its most general form, to a glazing article, comprising a substrate made of glass or made of organic substance, preferably made of plastic, in particular rigid plastic, on the surface of which are deposited:

a layer or a stack of layers conferring, on said article, a functionality, in particular solar protection, thermal insulation or anticondensation properties, with a total thickness of between 5 nanometers and 400 nanometers, preferably with a total thickness of between 10 and 300 nanometers or also with a total thickness of between 20 and 250 nanometers, an organic film covering said layer or said stack of layers, the thickness of the polymer film being between 300 nanometers and 10 micrometers, preferably between 500 nanometers and 5 micrometers and very preferably between 1 and 5 micrometers.

According to the invention, a texturing element is present under said layer or said stack of layers, the roughness of the surface of the texturing element being such that:

the arithmetic mean deviation $R_a$ is between 50 nm and 2 micrometers, limits included, is preferably between 100 nm and 1 micrometer, limits included, and very preferably is between 150 nm and 300 nm, limits included, the base length $R_{Sm}$ is between 5 micrometers and 300 micrometers, limits included, and is preferably between 10 micrometers and 200 micrometers, limits included.

The parameters $R_a$ and $R_{Sm}$ are defined in accordance with the international standard ISO4287 (1997).

According to the invention and in accordance with the above standard, the $R_a$ is defined as the arithmetic mean of the absolute values of the ordinates $z(x)$ measured over a profile of length l:

$$R_a = \frac{1}{l} \int_0^l |z(x)| dx$$

It should be remembered that the $R_{Sm}$ (mean period or mean pitch) of a profile (that is to say, according to a straight-line segment) of a surface is defined by the relationship:

$$R_{sm} = \frac{1}{n}\sum_{i=1}^{i=n} S_i = \frac{S_1 + S_2 + \ldots + S_n}{n}$$

in which $S_i$ is the distance between two zero crossings (median line) which are ascending, n+1 being the number of ascending zero crossings in the profile under consideration. This parameter $R_{Sm}$ is representative of the distance between peaks, that is to say of the pitch of the texture parallel to the general plane of the sheet. The values of $R_{Sm}$ and of $R_a$ are given after use of Gaussian filters with cut-offs at 2.5 µm and 0.8 mm (suppression of the periods of less than 2.5 µm and greater than 0.8 mm). The $R_{sm}$ and $R_a$ measurements are carried out over a distance of at least 4 mm.

In the present patent application, the roughness parameters are obtained in the following way. Representative surface areas representative of approximately (10 to 15)×(10 to 15) mm² were analyzed on each sample. Preferably, three different positions are chosen for each sample. These images are obtained by interferential profilometry using the Zygo Newview™ profilometer with a ×20 magnification. Profiles with a length of 4 mm are extracted from these measurements. The data are subsequently processed with the Mountain MapMountainsMap® software.

The three-dimensional surface roughness parameters were calculated using an appropriate analysis length combined with an appropriate low-pass Gaussian filter (ISO 13565-116610-21 for the profiles). The analysis length and the low-pass filter choice are judiciously chosen in order to distinguish the waviness parameters from the roughness parameters.

According to another very preferred parameter for implementation of the present invention, the refractive indices of the substrate and of the organic film, measured at 550 nm, are substantially identical. Substantially identical is understood to mean that the difference between the two refractive indices is less than 0.2, is preferably less than 0.15 or even less than 0.1 and very preferably is less than 0.05.

Very preferably, the protective organic film is transparent to IR radiation.

According to the invention, the deposition of the protective film preferably does not result or does not substantially result in modifications to the period of the texturing of the texturing element, it being possible, for example, for the texturing at the surface of the article according to the invention to be defined by the same $R_{Sm}$ ranges as described above.

On the other hand, the protective film can preferably limit the amplitude $R_a$ of the article according to the invention, for example in such a way that the $R_a$ of the article is less than 50% of the $R_a$ of the texturing element, preferably the $R_a$ of the article is less than 30% of the $R_a$ of the texturing element, more preferably the $R_a$ of the article is less than 15% of the $R_a$ of the texturing element, or even the $R_a$ of the article is less than 5% of the $R_a$ of the texturing element. Ideally, the surface of the article is substantially smooth. Preferably, the $R_a$ of the article is thus less than 50 nm, more preferably is less than 30 nm and very preferably is less than 20 nm, indeed even less than 10 nm.

According to preferred embodiments of the present invention, which can, very obviously, if appropriate, be combined with one another:

The refractive indices of the substrate and of the organic film, measured at 550 nm, are substantially identical.

The organic film is a polymer.

Said texturing element consists of a texturing of the surface of the glass substrate.

Said texturing element consists of a layer of an organic material, in particular polymer material, positioned between the surface of the glass substrate and the layer or the stack of layers, the surface of said organic layer in contact with said layer or with the stack of layers being textured.

Said texturing element is made of inorganic glass, of organic glass, of sol-gel material, of polymer or of sintered glass.

Said polymer layer positioned between the surface of the glass substrate and the layer or the stack of layers is made of PMMA (poly(methyl methacrylate)) or of PDMS (polydimethylsiloxane).

The organic film is chosen from a polymer chosen from the group of polyacrylonitrile (PAN), polymethacrylonitrile (PMAN), polycycloolefin, polyethylene (PE), polypropylene (PP) or polyacrylonitrile, polyvinylidene chloride (PVDC) or also styrene-butadiene (PSB), or polysilazanes.

The organic film is an organic sol-gel layer obtained in particular by polymerization of a TEOS or MTEOS solution.

The stack of thin layers reflecting infrared radiation comprises at least one metal layer chosen from silver, copper, gold and their alloys.

The stack of thin layers reflecting infrared radiation comprises, as upper layer, a dielectric layer of oxide, nitride or oxynitride, preferably of oxide, on which the protective organic film is directly deposited.

The substrate is made of glass.

The texturing is obtained by etching the surface of the glass substrate, in particular by a process of acid etching or basic etching or also by sandblasting.

The substrate is made of plastic substance, in particular is made of a plastic substance chosen from the group consisting of PMMA, polycarbonate and PET.

The texturing is obtained by application, to the surface of the substrate, of a layer of a textured material, in particular by embossing or by self-texturing.

The $R_a$ of the surface of said article is less than 50% of the $R_a$ of the surface of the texturing element.

The $R_a$ of the surface of the article is less than 50 nm.

The invention also relates to a single glazing incorporating an article as described above.

The invention additionally relates to a multiple glazing comprising an article as described above, in which the stack of thin layers, covered with said organic film, is positioned toward an external face of said glazing.

Preferably, in such a multiple glazing, the internal face of the article comprises a second stack of thin layers reflecting infrared radiation positioned toward the interior of the multiple glazing.

The invention also relates to the use of a substrate or of a glazing as described above as glazing having an anticondensation function or also to the use of a substrate or of a glazing as described above as glazing having a solar protection or thermal control function.

According to a first configuration of a glazing according to the invention, the glazing is a single glazing, that is to say that it comprises a single glass substrate on which is positioned a stack which influences infrared radiation incorporating a sequence of thin layers, including a silver layer, with a thickness, for example, of the order of 5 to 20 nanometers, reflecting infrared radiation. The silver layer comprises, above and below in the stack, layers of dielectric material of silicon oxides or nitride. An organic film, preferably of the polymer type, is deposited on the stack. The polymer film makes it possible to expose the stack on an external (interior or exterior) face of the glazing and to guarantee the durability thereof. In such a glazing, for example used as window for a building, the face on which the stack and the protective film are deposited is, for example, turned toward the inside of the building. This configuration makes possible the use of the single glazing as solar protection glazing or also as low-e glazing.

According to a second configuration of a glazing according to the invention, the glazing is a double or triple glazing, that is to say that it comprises two or three glass substrates separated by a gas-filled cavity or also a thermoplastic sheet of the PVB type. The stack which influences infrared radiation is deposited on an external face of the multiple glazing. An organic film, in particular a polymer film, is deposited on the stack. The polymer film makes it possible to expose the stack on an external (toward the interior or toward the exterior) face of the glazing and to guarantee the durability thereof.

According to a possible implementation of such a glazing, for example as window for a building or as wall of a refrigerated compartment, the stack covered with the film is present on the face 1 of the multiple glazing, the protective film being turned toward the outside of the building (conventionally, the faces of the glass substrates of a single or multiple glazing are numbered from the outside toward the inside of the passenger compartment/of the premises which it equips) or of the compartment. This configuration makes it possible to limit the condensation on said exterior face of a multiple glazing, in particular highly insulating triple glazings.

According to another implementation of such a glazing as window for a building or as wall of a refrigerated compartment, the stack covered with the film is positioned on the face 4 of the double glazing or the face 6 of a triple glazing, so that the face on which the stack and the protective film are deposited is that turned toward the inside of the building or of the compartment. This configuration makes possible the use of the multiple glazing as solar protection or thermal insulation (low-e) glazing. A particularly advantageous configuration of a double glazing according to this mode consists of a combination of this first stack deposited on face 4 with another infrared-reflecting stack, this time positioned on the face 2 or the face 3 of the double glazing.

Of course, it would also be possible to position the stack and the film on the two exterior faces of an article according to the invention. Such a configuration used in a single or multiple glazing would make it possible, for example, to obtain a glazing combining the low-e, solar protection and/or anticondensation functions.

While the application more particularly described above is the glazing for a building, it is clear that other applications can be envisaged, in particular in glazings for vehicles, such as side windows, sunroof or rear window, or also showcases or glass doors of freezers.

The advantages of the present invention are illustrated by means of the nonlimiting examples which follow.

REFERENCE EXAMPLE 1

A substrate made of clear glass with a thickness of 4 mm of Planilux type sold by Saint-Gobain Glass France, with a refractive index of 1.52 at 550 nm, is used.

A stack of layers is deposited on the substrate, without preliminary texturing stage, by the well-known techniques of magnetic-field-assisted cathode sputtering. The stack deposited is in accordance with example 4 of the application WO2007/101964 A1 and comprises a layer of silver with a thickness of 10 nm, to which example reference will be made for further information.

There is deposited, on this stack having a layer conferring an infrared-reflecting functionality on the glass article, a film of polyvinylidene chloride (PVDC with a refractive index n=1.65) of 3 micrometers, according to the liquid deposition process described below:

A film of PVDC is deposited at the surface of the substrate by spin coating techniques using a polyvinylidene chloride resin Ixan® SGA-1 sold by Solvay and dissolved beforehand in ethyl acetate (solvent). The angular velocity and the concentration of the resin in the solvent are adjusted in the spinner in order to obtain a layer with a thickness of the order of 3 micrometers.

A first reference glazing is thus obtained.

Example According to the Invention

In this example, the protocol for producing the glazing described in the preceding reference example is taken up in an identical fashion but, in addition, an etching with acid according to the well-known techniques of the art is carried out at the surface of the glass.

The etching is carried out under conditions which make it possible to obtain a texturing of the surface of the glass such that the $R_a$ value is of the order of 200 nanometers for an $R_{Sm}$ value of the order of 70 micrometers.

The images which make it possible to measure the roughness are obtained by interferential profilometry using the Zygo Newview™ profilometer with a ×20 magnification. The data are subsequently processed by the Mountain Map-MountainsMap® software, according to the methods and principles already described above.

The samples according to the reference example and the example according to the invention are subsequently subjected to the following tests in order to measure their optical and energy performance qualities and also their durability.

The optical and energy properties and the durability of the different glazings are measured according to the following criteria:

Transmission $T_L$: light transmission as % according to the D65 illuminant, according to the criteria defined in the international standard ISO 9050: 2003.

Light reflection $R_{L1}$: light transmission as % according to the D65 illuminant, layer side, according to the criteria defined in the international standard ISO 9050: 2003.

normal emissivity ($\varepsilon_n$): it is calculated according to the criteria defined in the international standard NF EN 12898: 2001.

Haze: Haze, measured as percentage, is understood to mean, within the meaning of the present invention, the loss by scattering of the light, that is to say, conventionally, the ratio of the scattered part of the light (diffuse fraction or $T_d$) to the light directly transmitted through the glazing ($T_L$), generally expressed as percentages. The diffuse transmission thus measures the light fraction scattered by the layers deposited at the surface of the glass substrate. The haze can conventionally be measured by spectroscopy techniques, the integration over the whole visible region (380-780 nm) making it possible to determine the normal transmission $T_L$ and the diffuse transmission $T_d$. Such a measurement can also be obtained by the use of a haze meter. It is considered that a glazing remains transparent if its haze remains less than 10% and is preferably less than 5% or even less than 1% during a measurement with a haze meter. The appliance used is a Haze-Gard® device sold by BYK-Gardner.

Clarity: The clarity is also measured by virtue of the haze meter. A light ray strikes the sample and penetrates the integrating sphere of the appliance. An annular sensor fitted at the outlet orifice of the sphere detects the light scattered at the smallest angles, defined as the clarity.

Sheet resistance $\Omega/\square$: the sheet resistance is measured conventionally, for example as described in the reference publication "Les techniques de l'ingénieur, *Vitrage à isolation thermique renforcée* [Techniques of the Engineer, *Reinforced Thermal Insulation Glazing*], C3635 (2004)".

$SO_2$ test: this is a first test of durability of the stack protected by the film toward acid attacks ($SO_2$ vapor). The test carried out is in accordance with that described in the standard EN1096-2: 2001, annex C. First, the conformity of the glazing with the standard, in particular visually, is confirmed. The variation in emissivity ($\Delta\varepsilon$) and in the light transmission ($\Delta T_L$) after the test is also measured.

The combined results obtained have been given in table 1 below:

TABLE 1

| Units | Thickness of the film µm | $R_{L1}$ L* % | a* % | b* % | $T_L$ % | Clarity % | Haze % | $\varepsilon_n$ % | $R_\square$ ohms square | Variation after $SO_2$ test (5 days) $\Delta\varepsilon$ | $\Delta T_L$ | visual appearance |
|---|---|---|---|---|---|---|---|---|---|---|---|---|
| Reference | 3 | 57 | 5.2 | 11.6 | 68 | 99.8 | 0.2 | 26 | 2.93 | 0.9 | 0.2 | OK |
| Example according to the invention | 3 | 57 | 5.4 | 12.7 | 67 | 91.3 | 0.95 | 30 | 2.95 | 0.9 | 0.1 | OK |

The results given in the preceding table 1 show that the optical, colorimetric and energy performance qualities of the samples according to the reference example and the example according to the invention are substantially identical.

The appended photographs (FIG. 1) show the visual appearance of the two samples: It is seen that the reference glazing (1*a*) exhibits an iridescence of concentric shape which is not observed on the glazing according to the invention (1*b*), that is to say exhibiting a surface texturing in accordance with the subject matter of the claims which follow.

The invention claimed is:

1. A glazing article, comprising a substrate made of glass or made of organic substance, on the surface of which are deposited:
a layer or a stack of layers conferring, on said article, a functionality, with a total thickness of between 5 nanometers and 400 nanometers, said layer or stack of layers being an infrared radiation reflecting layer or an infrared radiation reflecting stack of layers, a low emissivity layer or a low emissivity stack of layers, or an anticondensation layer or an anticondensation stack of layers, an organic film covering said layer or said stack of layers, a thickness of the organic film being between 300 nanometers and 10 micrometers, wherein a texturing element is present under said layer or said stack of layers, a roughness of the surface of the texturing element being such that: an arithmetic mean deviation Ra is between 50 nm and 2 micrometers, limits included, a base length Rsm is between 5 micrometers and 300 micrometers, limits included.

2. The article as claimed in claim 1, wherein the refractive indices of the substrate and of the organic film, measured at 550 nm, are substantially identical.

3. The article as claimed in claim 1, wherein the organic film is a polymer.

4. The article as claimed in claim 1, wherein said texturing element consists of the surface of the substrate.

5. The article as claimed in claim 1, wherein said texturing element consists of a layer of an organic material positioned between the surface of the substrate and the layer or the stack of layers, the surface of said organic layer in contact with said layer or with the stack of layers, and said organic layer being textured.

6. The article as claimed in claim 1, wherein said texturing element is made of inorganic glass, of organic glass, of sol-gel material, of polymer or of sintered glass.

7. The article as claimed in claim 6, wherein said texturing element is positioned between the surface of the substrate and the layer or the stack of layers and is made of PMMA (poly(methyl methacrylate)) or of PDMS (polydimethylsiloxane).

8. The article as claimed in claim 1, wherein the organic film is chosen from a polymer selected from the group consisting of polyacrylonitrile (PAN), polymethacrylonitrile (PMAN), polycycloolefin, polyethylene (PE), polypropylene (PP), polyvinylidene chloride (PVDC), styrene-butadiene (PSB), and polysilazanes.

9. The article as claimed in claim 1, wherein the organic film is an organic sol-gel layer.

10. The glass article as claimed in claim 1, wherein the stack of layers reflects infrared radiation and comprises at least one metal layer chosen from silver, copper, gold or their alloys.

11. The glass article as claimed in claim 1, wherein the stack of layers reflects infrared radiation and comprises an upper layer that is a dielectric layer of oxide, nitride or oxynitride, on which the organic film is directly deposited.

12. The article as claimed in claim 1, wherein the substrate is made of glass.

13. The article as claimed in claim 12, wherein the texturing element is obtained by etching the surface of the glass substrate.

14. The article as claimed in claim 1, wherein the substrate is made of plastic substance chosen from the group consisting of PMMA, polycarbonate and polyethylene terephthalate (PET).

15. The article as claimed in claim 14, wherein the texturing element is obtained by application, to the surface of the substrate, of a layer of a textured material.

16. The article as claimed in claim 1, wherein a $R_a$ of the surface of said article is less than 50% of the $R_a$ of the surface of the texturing element.

17. The article as claimed in claim 1, wherein a $R_a$ of the surface of the article is less than 50 nm.

18. The article as claimed in claim 1, wherein the functionality is solar protection, thermal insulation or anticondensation properties.

19. The article as claimed in claim 5, wherein said organic material is a polymer material.

20. The article as claimed in claim 9, wherein the organic sol-gel layer is obtained by polymerization of a tetraethoxysilane (TEOS) or methyltriethoxysilane (MTEOS) Solution.

21. The article as claimed in claim 13, wherein the texturing element is obtained by a process of acid etching or basic etching or by sandblasting.

22. The article as claimed in claim 15, wherein the texturing element is obtained by embossing or by self-texturing.

23. The article as claimed in claim 1, wherein the texturing element, the layer or stack or layers and the organic film each cover entirely a same main face of the substrate.

24. The article as claimed in claim 1, wherein, at each location of the surface of the substrate where the organic film covers said layer or said stack of layers, the texturing element is present at said location under said layer or said stack of layers and between said substrate and said layer or said stack of layers to prevent formation of iridescent zones generated by optical interferences between the organic film and said layer or said stack of layers.

25. The article as claimed in claim 24, wherein at said location of the surface of the substrate where the organic film covers said layer or said stack of layers, the article has a haze value of less than 10%.

26. The article as claimed in claim 25, wherein the haze value is less than 5%.

* * * * *